(12) United States Patent
Kozhikkottu et al.

(10) Patent No.: US 11,216,386 B2
(45) Date of Patent: Jan. 4, 2022

(54) TECHNIQUES FOR SETTING A 2-LEVEL AUTO-CLOSE TIMER TO ACCESS A MEMORY DEVICE

(71) Applicant: Intel Corporation, Santa Clara, CA (US)

(72) Inventors: Vivek Kozhikkottu, Hillsboro, OR (US); Suresh Chittor, Portland, OR (US); Esha Choukse, Austin, TX (US); Shankar Ganesh Ramasubramanian, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 93 days.

(21) Appl. No.: 16/584,612

(22) Filed: Sep. 26, 2019

(65) Prior Publication Data

US 2020/0019513 A1 Jan. 16, 2020

(51) Int. Cl.
*G06F 12/10* (2016.01)
*G06F 12/1045* (2016.01)
*G06F 12/06* (2006.01)
*G06F 11/30* (2006.01)
*G06F 13/16* (2006.01)
*G06F 12/02* (2006.01)

(52) U.S. Cl.
CPC ...... *G06F 12/1054* (2013.01); *G06F 11/3037* (2013.01); *G06F 12/0207* (2013.01); *G06F 12/0623* (2013.01); *G06F 13/1689* (2013.01); *G06F 2212/684* (2013.01)

(58) Field of Classification Search
CPC ............. G06F 12/1054; G06F 12/0623; G06F 12/0207; G06F 12/0851; G06F 12/0895; G06F 11/3037; G06F 13/1689; G06F 2212/684
See application file for complete search history.

(56) References Cited

U.S. PATENT DOCUMENTS

| 7,133,995 B1 | 11/2006 | Isaac et al. | |
|---|---|---|---|
| 2003/0126354 A1* | 7/2003 | Kahn | G06F 12/0215 711/105 |
| 2003/0189870 A1* | 10/2003 | Wilcox | G11C 7/22 365/189.18 |

OTHER PUBLICATIONS

Hur, Ibrahim et al., "Adaptive History-Based Memory Schedulers", Proceedings of the 37th International Symposium on Microarchitecture (MICRO-37 2004), IEEE Computer Society, 2004 IEEE, 12 pages, Austin, Texas.

(Continued)

*Primary Examiner* — Hiep T Nguyen
(74) *Attorney, Agent, or Firm* — Compass IP Law PC

(57) ABSTRACT

Techniques for setting a 2-level auto-close timer to access a memory device include examples of setting first and second time values for the 2-level auto-close timer to cause accessed rows to auto-close following a cache line access to a row of a bank of memory devices. For these examples, the cache line access is responsive to a multi-channel address interleaving policy that causes either successive or non-successive cache line accesses to the bank of memory devices.

21 Claims, 12 Drawing Sheets

*900*

SET A FIRST TIME VALUE FOR A FIRST LEVEL OF A 2-LEVEL AUTO-CLOSE TIMER, THE FIRST LEVEL OF THE 2-LEVEL AUTO-CLOSE TIMER TO CAUSE A ROW OF A BANK OF FIRST MEMORY DEVICES TO AUTO-CLOSE FOLLOWING A FIRST CACHE LINE ACCESS TO THE ROW RESPONSIVE TO A MULTI-CHANNEL ADDRESS INTERLEAVE POLICY THAT CAUSES SUCCESSIVE CACHE LINE ACCESSES TO THE BANK OF FIRST MEMORY DEVICES VIA A FIRST CHANNEL COUPLED WITH A PROCESSOR
*902*

SET A SECOND TIME VALUE FOR A SECOND LEVEL OF THE 2-LEVEL AUTO-CLOSE TIMER, THE SECOND LEVEL OF THE 2-LEVEL AUTO-CLOSE TIMER TO CAUSE THE ROW TO AUTO-CLOSE FOLLOWING A SECOND CACHE LINE ACCESS TO THE ROW RESPONSIVE TO THE MULTI-CHANNEL INTERLEAVE POLICY THAT CAUSES NON-SUCCESSIVE CACHE LINE ACCESSES TO THE BANK OF FIRST MEMORY DEVICES VIA THE FIRST CHANNEL
*904*

(56) References Cited

OTHER PUBLICATIONS

Kumar, Karthik et al., "Energy Efficient DRAM Row Buffer Management for Enterprise Workloads", 2010 IEEE, 4 pages, USA.
Ma, Chiyuan et al., "A DRAM Precharge Policy Based on Address Analysis", 10th Euromicro Conference on Digital System Design Architectures, Methods and Tools (DSD 2007), IEEE Computer Society, 2007 IEEE, 5 pages, P R. China.
Zhang, Zhao et al., "A Permutation-based Page Interleaving Scheme to Reduce Row-buffer Conflicts and Exploit Data Locality", 2000 IEEE, pp. 32-41, USA.

\* cited by examiner

| Bit 12 | Bit 11 | Bit 10 | Bit 9 | Bit 8 | Bit 7 | Bit 6 |
|---|---|---|---|---|---|---|
| Channel | Channel | Channel | Column | Channel | Column | Column |

Address Interleave Policy 300

SET A FIRST TIME VALUE FOR A FIRST LEVEL OF A 2-LEVEL AUTO-CLOSE TIMER, THE FIRST LEVEL OF THE 2-LEVEL AUTO-CLOSE TIMER TO CAUSE A ROW OF A BANK OF FIRST MEMORY DEVICES TO AUTO-CLOSE FOLLOWING A FIRST CACHE LINE ACCESS TO THE ROW RESPONSIVE TO A MULTI-CHANNEL ADDRESS INTERLEAVE POLICY THAT CAUSES SUCCESSIVE CACHE LINE ACCESSES TO THE BANK OF FIRST MEMORY DEVICES VIA A FIRST CHANNEL COUPLED WITH A PROCESSOR
902

SET A SECOND TIME VALUE FOR A SECOND LEVEL OF THE 2-LEVEL AUTO-CLOSE TIMER, THE SECOND LEVEL OF THE 2-LEVEL AUTO-CLOSE TIMER TO CAUSE THE ROW TO AUTO-CLOSE FOLLOWING A SECOND CACHE LINE ACCESS TO THE ROW RESPONSIVE TO THE MULTI-CHANNEL INTERLEAVE POLICY THAT CAUSES NON-SUCCESSIVE CACHE LINE ACCESSES TO THE BANK OF FIRST MEMORY DEVICES VIA THE FIRST CHANNEL
904

FIG. 9

Storage Medium *1000*

Computer Executable Instructions for 900

FIG. 10

TECHNIQUES FOR SETTING A 2-LEVEL AUTO-CLOSE TIMER TO ACCESS A MEMORY DEVICE

TECHNICAL FIELD

Descriptions are generally related to techniques for accessing memory.

BACKGROUND

Computing platforms including dynamic random access memory (DRAM) systems may arrange DRAM systems to have multiple channels, ranks, and banks to enable parallel access to DRAM devices of the DRAM systems. This parallel access may boost memory access bandwidth to better meet tight latency and memory capacity needs of computing platforms that may include central processing units having multiple cores and/or processor sockets coupled with a DRAM system via the multiple channels. These DRAM devices of a DRAM system may include multiple DRAM chips or dies included in a rank arranged in multiple banks. The banks may be further divided into multiple rows spanning across the multiple DRAM chips to provide greater memory address capacity for accessing DRAM systems. Each bank may be further divided into multiple columns to provide locality.

In an operating DRAM system, a given bank may either have a row open, or no rows open. Memory elements or cells within a row are typically identified as a page or memory page. In some examples, in order to access data within a page, the page is opened or activated. The opening of the page causes the data maintained in the memory cells of the page to be loaded into a buffer (e.g., a sense amplifier) associated with the bank being accessed. This allows a read from or a write to access of data within the page. Accessing an already open row/page of the given bank is commonly referred to as a "page hit". Accessing a bank that doesn't have any rows open is commonly referred to as an "empty". Accessing a non-open row of a bank when a separate row of the bank is still open is commonly referred to as a "page miss". A page hit will have a lower access latency compared to an empty because there is no need to open or activate a page before a request access can take place during a page hit. Meanwhile, for an empty, the page needs to be opened and the contents of the page are loaded into the buffer before the memory cells may be accessed. Also, an empty has a lower access latency compared to a page miss because, with a page miss, the still opened page needs to be closed before the non-opened row can be opened.

BRIEF DESCRIPTION OF THE DRAWINGS

FIG. 3 illustrates an example address interleave policy.
FIG. 9 illustrates an example second logic flow.
FIG. 10 illustrates an example storage medium.

DETAILED DESCRIPTION

Figure 1:
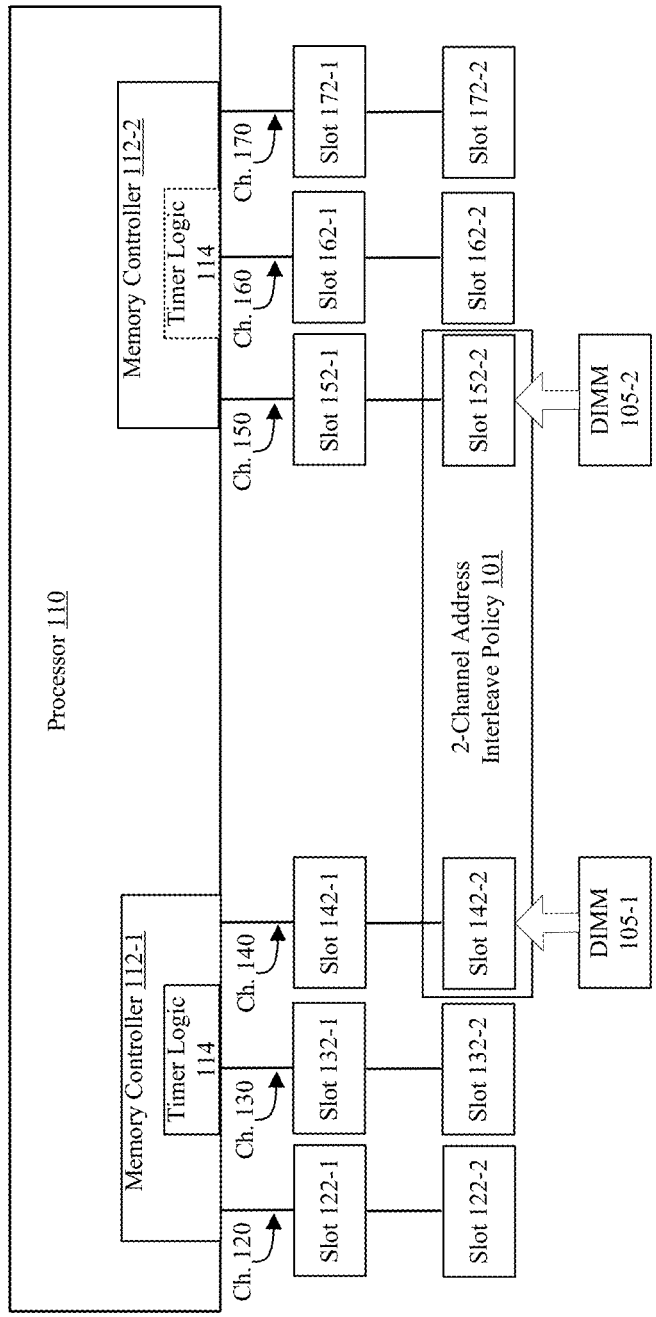
FIG. 1 illustrates an example system.

Operating performance for DRAM systems may closely depend on when an opened row/page is closed for a bank of a DRAM device. Some DRAM devices implement auto-close timers to close a row after a predetermined time from a last access to a bank. In an example, a row 'x' of a bank is accessed. A next access to the bank can either be to the same row 'x', or to a different row 'y'. For this example, if another access to row 'x' occurs, and row 'x' has been closed due to an auto-close timer, the other access is commonly referred to as an empty that could have been a page hit if the auto-close timer had been set with a higher time value. This would be a reason to increase the time value of the auto-close timer so that the opened row is kept open longed enough to still be kept open for the other access and thus result in a page hit. This first type of access may be referred to as a "type-I access". On an other hand, if after access to row 'x', row 'y' was selected for accessing, but row 'x' is still open due to the auto-close timer not yet expiring, then a page miss that could have been an empty if the auto-close timer had been set with a lower time value occurs. This page miss that could have been an empty would be a reason to decrease the time value of the auto-close timer. This type of access may be referred to as a "type-II access". An access that involves an empty has a lower access latency compared to a type-II access that involves a page miss. A goal for an auto-close policy would be to have a higher incidence of type-I accesses than type-II accesses.

A technique known as address interleaving may be implemented (e.g., by a memory controller) to access DRAM devices of a DRAM system. Address interleaving may include accessing different channels, banks and ranks to gain data bandwidth benefits via bank-level parallelism. A physical memory address may be stripped across multiple channels in a way to strike a balance between page hits and bank-level parallelism. For example, physical memory addresses for a stream of cache lines (e.g., 64 byte cache line sizes) may be stripped across multiple channels.

In some examples, stripping physical memory addresses for a stream of cache lines across first and second channels may be such that physical addresses of a first number of the stream of cache lines may be distributed across a row of a first bank mapped to the first channel and a second number of the stream of cache lines may be distributed across a row of a second bank mapped to the second channel. Thus, when a request is received to access physical addresses for the cache line stream, the first and second banks may be accessed in an interleaved manner to increase memory access bandwidth. The interleaved manner of these accesses results in a 2-level inter-arrival time between accesses to the same bank. A first level being a time for accessing cache lines distributed across a row of a given bank and a second level being when the row or another row of the given bank is subsequently accessed.

According to some examples, an address interleaving policy, may include a 4-way interleave that maps physical addresses of a first four adjacent cache lines of a stream of cache lines to a first channel and a first bank, maps physical addresses of a next four adjacent cache lines of the stream to a second channel and a second bank, maps physical addresses of a next four adjacent cache lines of the stream to the first channel and the first bank and so on. For this example, the 2-level inter-arrival time would have a first level that is approximately an amount of time to access a cache line at the first bank via the first channel and a second level is approximately an amount of time to access all four cache lines at the second bank via the second channel. In other words, the second level is the approximate time the cache line is interleaved from the first channel to the second channel and access returns to the first channel. If DRAM accesses are made according to this address interleaving policy, then accesses to the next four adjacent cache lines of the stream to the first channel and the first bank can potentially be page hits, but the auto-close timer needs to keep a previously accessed row of the first bank open long enough to account for the amount of time to access the four cache lines at the second bank via the second channel. Put another way, the auto-close timer needs to keep the row open long enough for the 4-way interleave of the address interleaving policy to roll back to accessing rows of the first bank mapped to the first channel.

In some DRAM systems, accesses to DRAM devices may see cache line streams of varied lengths. The varied lengths of cache line streams may be a property of singe-core access requests placed by a core of a central processing unit (CPU) coupled with these DRAM systems. Interference between access requests from different cores of the CPU may also cause varied lengths. The above-mentioned 2-level inter-arrival timing for row/bank accesses makes it a challenge to have a single-level auto-close timer that can adapt to 2-level inter-arrival times. Depending on a learning rate of this single-level auto-close timer, the single-level auto-close timer may either oscillate between timer values that are too low or are too high, or just settle somewhere in between. This oscillation may decrease type-I accesses and result in an increase in the less desirable type-II accesses. Decreasing type-I accesses and increasing type-II accesses increases overall access latencies. Thus, a single-level auto-closer timer may be problematic for DRAM systems implementing address interleaving policies.

FIG. 1 illustrates an example system 100. In some examples, as shown in FIG. 1, system 100 includes a processor 110 coupled with slots 122-1/2, 132-1/2, 142-1/2, 152-1/2, 162-1/2 and 172-1/2 via respective channels 120, 130, 140, 150, 160 and 170. For these examples, processor 110 may include a first memory controller 112-1 to control access to memory devices (e.g., arranged on a dual in-line memory module (DIMM)) when inserted in slots 122-1/2, 132-1/2 or 142-1/2 and a second memory controller 112-2 to control access to memory devices when inserted in slots 152-1/2, 162-1/2 or 172-1/2.

According to some examples, each slot depicted in FIG. 1, may be arranged to receive memory devices arranged on separate DIMMs. For example, memory devices included in DIMM 105-1 to be inserted in slot 142-2 or DIMM 105-2 to be inserted in slot 152-2. For these examples, the separate DIMMs may include memory devices having non-volatile or volatile types of memory. Volatile types of memory may include, but are not limited to, DRAM types of volatile memory. As described more below, memory devices such as memory devices included in DIMMs 105-1 or 105-2 may be arranged in one or more ranks that may connect multiple memory chips or die into a same memory bus (address+data). Each rank may be divided into multiple banks which span across the multiple memory chips or die. Also as described more below, banks may be further divided into multiple rows spanning across the multiple DRAM chips to provide greater memory address capacity for accessing DRAM systems. Also, respective banks may be further divided into multiple columns to provide locality for identifying a specific physical memory address for a given row.

In some examples, as shown in FIG. 1, processor 110 includes memory controller 112-1 coupled to channels 120, 130 and 140 and memory controller 112-2 coupled to channels 150, 160 and 170. Examples are not limited to a processor including two separate memory controllers coupled to three data channels. Examples may include a processor with a single memory controller coupled with more or less than 3 data channels coupled to the single memory controller. Other examples may include more than two memory controllers and more or less than 6 data channels. For the example shown in FIG. 1, in order to reduce memory access request bottlenecks, multiple channels 120, 130, 140, 150, 160 and 170 may be employed in system 100. According to some examples, processor 110 may represent a single or multiple core processor.

According to some examples, a 2-channel address interleave policy 101 may be implemented that includes stripping physical memory addresses for a stream of cache lines (e.g., each 64 bytes in size) stored to memory devices included in DIMMs 105-1 and 105-2 across channels 140 and 150 to in a way to strike a balance between page hits and bank-level parallelism. As described in more detail below, logic and/or features of a memory controller such as timer logic 114 may be capable of setting and adjusting a multi-level auto-close timer to close rows of a bank accessed according to an address interleave policy such as 2-channel address interleave policy 101 to accommodate 2-level inter-arrival times created by implementation of a multi-channel address interleave policy.

According to some examples, at least some of the one or more memory devices included DIMMs to be inserted in slots 122-1/2, 132-1/2, 142-1/2, 152-1/2, 162-1/2 or 172-1/2 and channels 120, 130, 140, 150, 160 or 170 to access these memory devices may be designed to operate in accordance with various memory technologies. The various memory technologies may include, but are not limited to, DDR4 (DDR version 4, initial specification published in September 2012 by JEDEC), LPDDR4 (LOW POWER DOUBLE DATA RATE (LPDDR) version 4, JESD209-4, originally published by JEDEC in August 2014), WIO2 (Wide I/O 2 (WideIO2), JESD229-2, originally published by JEDEC in August 2014), HBM (HIGH BANDWIDTH MEMORY DRAM, JESD235, originally published by JEDEC in October 2013), HBM2, version 2, JESD235A, originally published by JEDEC in January 2016, and/or other technologies based on derivatives or extensions of such specifications. The various memory technologies may also include memory technologies currently in development that may include, but are not limited to, DDR5 (DDR version 5, currently in discussion by JEDEC), LPDDR5 (LPDDR version 5, currently in discussion by JEDEC), HBM3 (HBM version 3, currently in discussion by JEDEC), non-volatile DIMM-persistent (NVDIMM-P currently in discussion by JEDEC), and/or other new technologies based on derivatives or extensions of these developing memory technologies.

According to some examples, DIMMs to be inserted in slots 122-1/2, 132-1/2, 142-1/2, 152-1/2, 162-1/2 or 172-1/2 such as DIMMs 105-1 or 105-2 may be designed to function as a registered DIMM (RDIMM), a load reduced DIMM (LRDIMM), a fully-buffered DIMM (FB-DIMM), an unbuffered DIMM (UDIMM) or a small outline (SODIMM). Examples are not limited to only these DIMM designs.

In some examples, memory devices or die included in DIMMs to be inserted in slots 122-1/2, 132-1/2, 142-1/2, 152-1/2, 162-1/2 or 172-1/2 may include non-volatile and/or volatile types of memory. Volatile types of memory may include, but are not limited to, random-access memory (RAM), Dynamic RAM (DRAM), double data rate synchronous dynamic RAM (DDR SDRAM), static random-access memory (SRAM), thyristor RAM (T-RAM) or zero-capacitor RAM (Z-RAM). Non-volatile types of memory may include byte or block addressable types of non-volatile memory having a 3-dimensional (3-D) cross-point memory structure that includes, but is not limited to, chalcogenide phase change material (e.g., chalcogenide glass) hereinafter referred to as "3-D cross-point memory". Non-volatile types of memory may also include other types of byte or block addressable non-volatile memory such as, but not limited to, multi-threshold level NAND flash memory, NOR flash memory, single or multi-level phase change memory (PCM), resistive memory, nanowire memory, ferroelectric transistor random access memory (FeTRAM), anti-ferroelectric memory, resistive memory including a metal oxide base, an oxygen vacancy base and a conductive bridge random access memory (CB-RAM), a spintronic magnetic junction memory, a magnetic tunneling junction (MTJ) memory, a domain wall (DW) and spin orbit transfer (SOT) memory, a thyristor based memory, a magnetoresistive random access memory (MRAM) that incorporates memristor technology, spin transfer torque MRAM (STT-MRAM), or a combination of any of the above.

Figure 2:
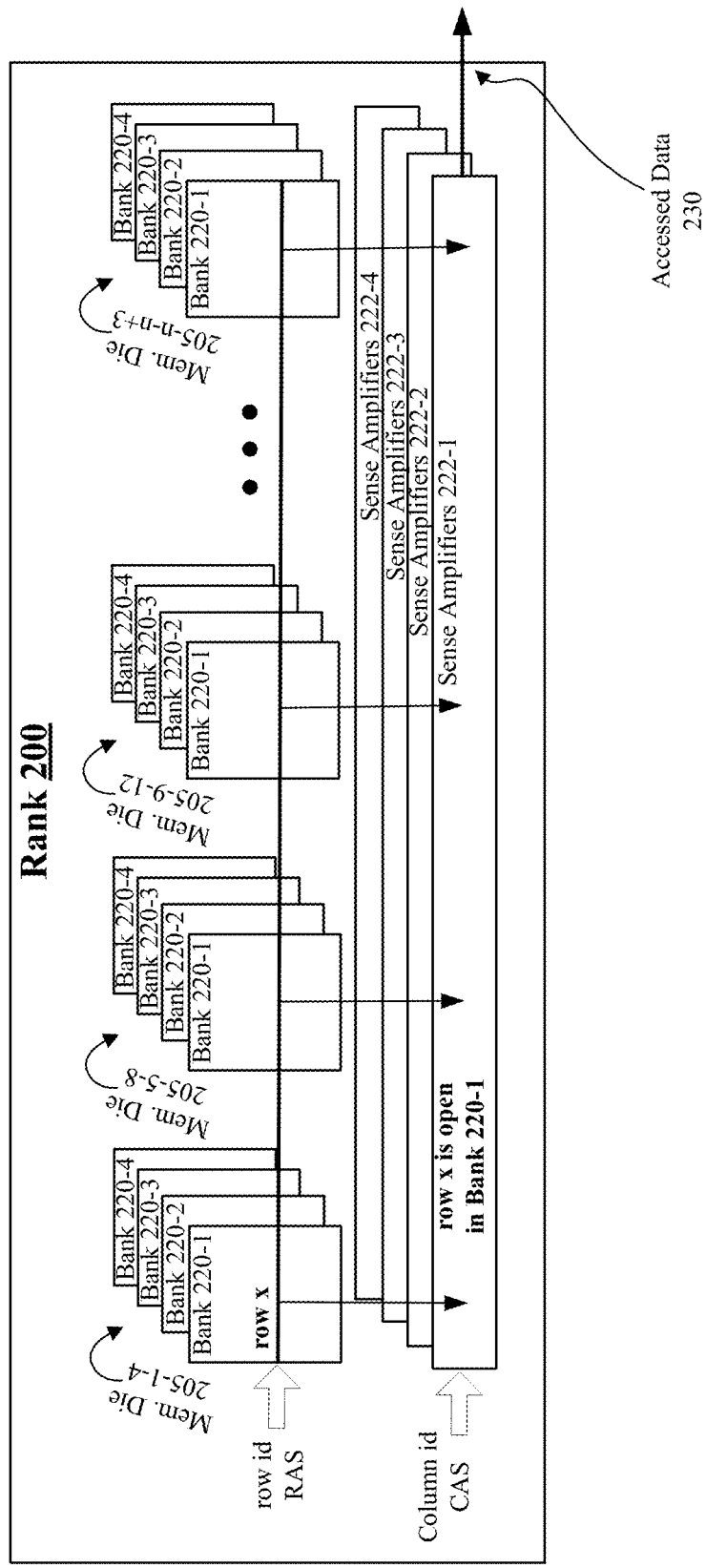
FIG. 2 illustrates an example rank.

FIG. 2 illustrates an example rank 200 for DIMM 105-1. In some examples, as mentioned previously, memory may be spatially organized into channels, ranks, banks rows and columns. As shown in FIG. 2, in some examples, rank 200 may be organized to have four banks 220-1 to 220-4 (examples not limited to four banks) spanning across multiple memory dies. For example, bank 220-1 may span across memory dies 205-1, 205-8, 205-9 and 205-n, where "n" is any whole, positive integer >12. On a memory access to bank 220-1, first the channel, rank and bank are identified. Then an entire row or page, depicted in FIG. 2 as "row x" (e.g., 8 kilobytes (KB) in size) of bank 220-1 may be loaded onto a set of sense amplifiers that is shown in FIG. 2 as sense amplifiers 222-1. The set of sense amplifiers may also be referred to as a row buffer. A corresponding column address for this memory access then identifies a locality reference for reading or writing data to bank 220-1.

According to some examples, if a row is kept open for at least a period of time, and a subsequent memory access is to the same open row (page hit), then access latency is reduced since the subsequently accessed row need not be reloaded to sense amplifiers 222-1. However, if the subsequent access is to a different row of bank 220-1 (page miss), sense amplifiers 222-1 need to be flushed before the different row is loaded, this adds to access latency. As mentioned above, a page miss has a higher access latency than an empty access, since the flushing of sense amplifiers 222-1 and then loading of the different row takes longer than just loading the different row if row x is no longer open. In order to minimize access latencies, row x should be held open long enough to maximize the likelihood of page hits yet short enough to minimize page misses. As mentioned previously, some techniques may use a single level auto-close timer that is initiated once row x is opened and then automatically closes row x once the single-level auto-close timer expires. A single-level auto-close timer may be problematic when multi-channel address interleaving policies are implemented.

In some examples, as mentioned above for FIG. 1, a 2-channel address interleaving policy 101 may include the use of DIMM 105-1. For these examples, stripping of physical memory addresses for a stream of cache lines across two channels may result in 2-level inter-arrival times. As mentioned previously, multiple inter-arrival times may make use of a single-level auto-close timer problematic. Use of a single-level auto-close timer is also problematic when cache line streams may vary in length based on the type of applications executed by processor 110 when accessing these cache line streams or due to interference between access requests from different cores of processor 110 (if configured as a multi-core processor). As described more below, logic and/or features of a memory controller at a processor such as timer logic 114 of memory controller 112-1 or 112-2 may set and adjust two separate auto-close times for an auto-close timer with two levels, referred to hereinafter as a "2-level auto-close timer". The 2-level auto-close timer, for example, may accommodate the 2-level inter-arrival times created by implementation of 2-channel address interleaving policy 101.

FIG. 3 illustrates an example address interleave policy 300. In some examples, address interleave policy 300 may represent a physical address interleave for a first 4-way interleave that maps physical memory addresses of a first four lines of a stream of cache lines to a first channel and a first bank as part of a 2-channel address interleaving policy. For these examples, since memory is accessed at a cache line granularity of 64 bytes, the least significant 6 bits of an example 12 bit physical memory address is not part of address interleave policy 300. Also, as shown in FIG. 3, bits 6, 7 and 9 are utilized for column mapping, whereas bits 8, 10, 11 and 12 are for channel mapping. This means that in a cache stream, the first four cache lines (e.g., cache lines 0-3) are mapped to a same first channel and a same first bank. A second 4-way interleave that maps physical memory addresses of a next set of four cache lines (e.g., cache lines 4-7) of the stream are then mapped to a second channel. Then the next four cache lines (e.g., cache lines 8-11 are mapped to the first channel and first bank, and so on. More details on how this type of 4-way interleave policy may be implemented is described more below.

In some examples, address interleave policy 300 allows for a memory address for a stream of cache lines to be stripped across multiple channels in a way to hit a balance between page hits and bank-level parallelism. This is done by using some of the lower bits for columns and then striping across the multiple channels. Although address interleave policy 300 is for a 4-way interleave, examples are not limited to a 4-way interleave for mapping cache lines to a same channel and bank.

Figure 4A:
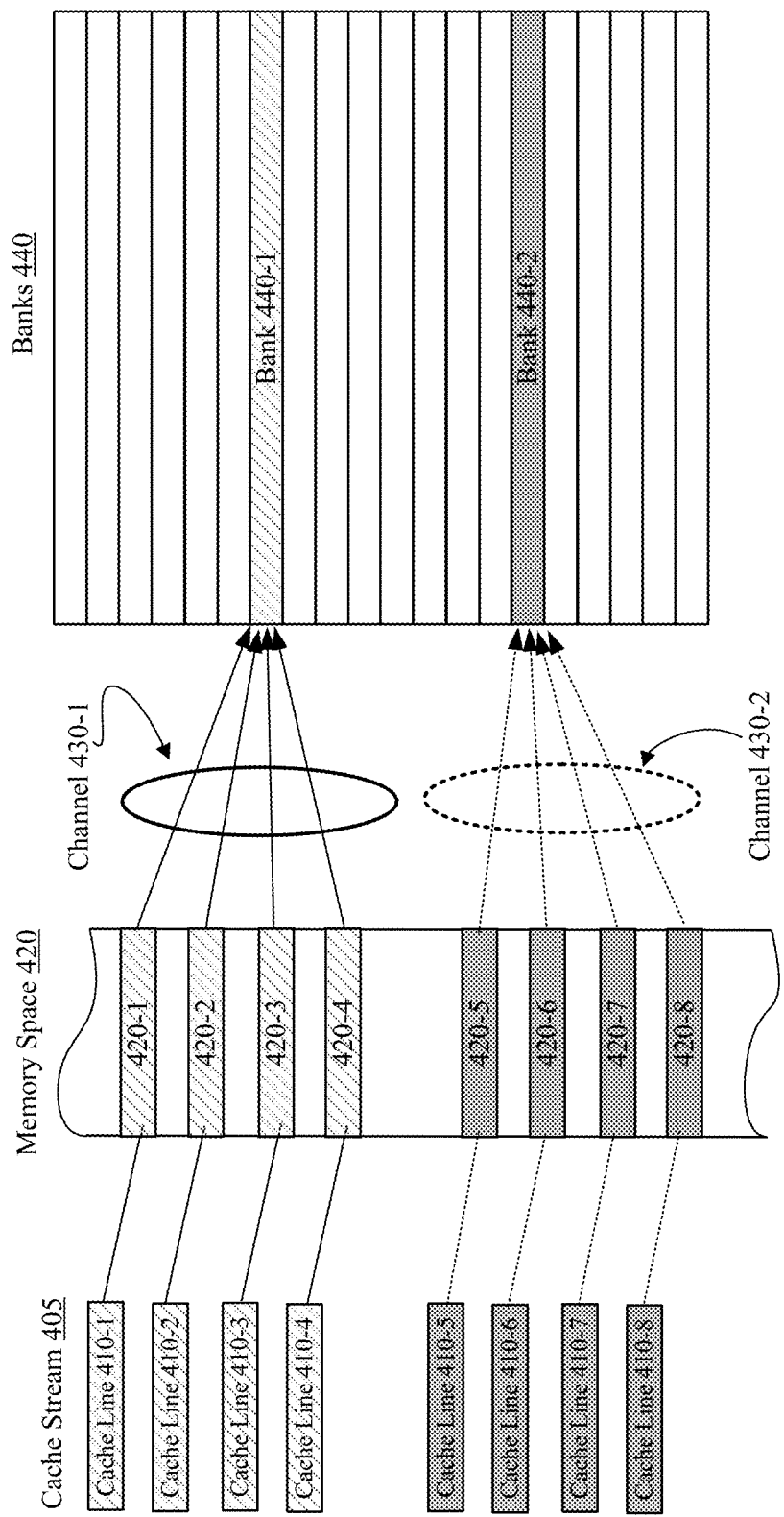
FIGS. 4A-B illustrate an example scheme.
Figure 4B:
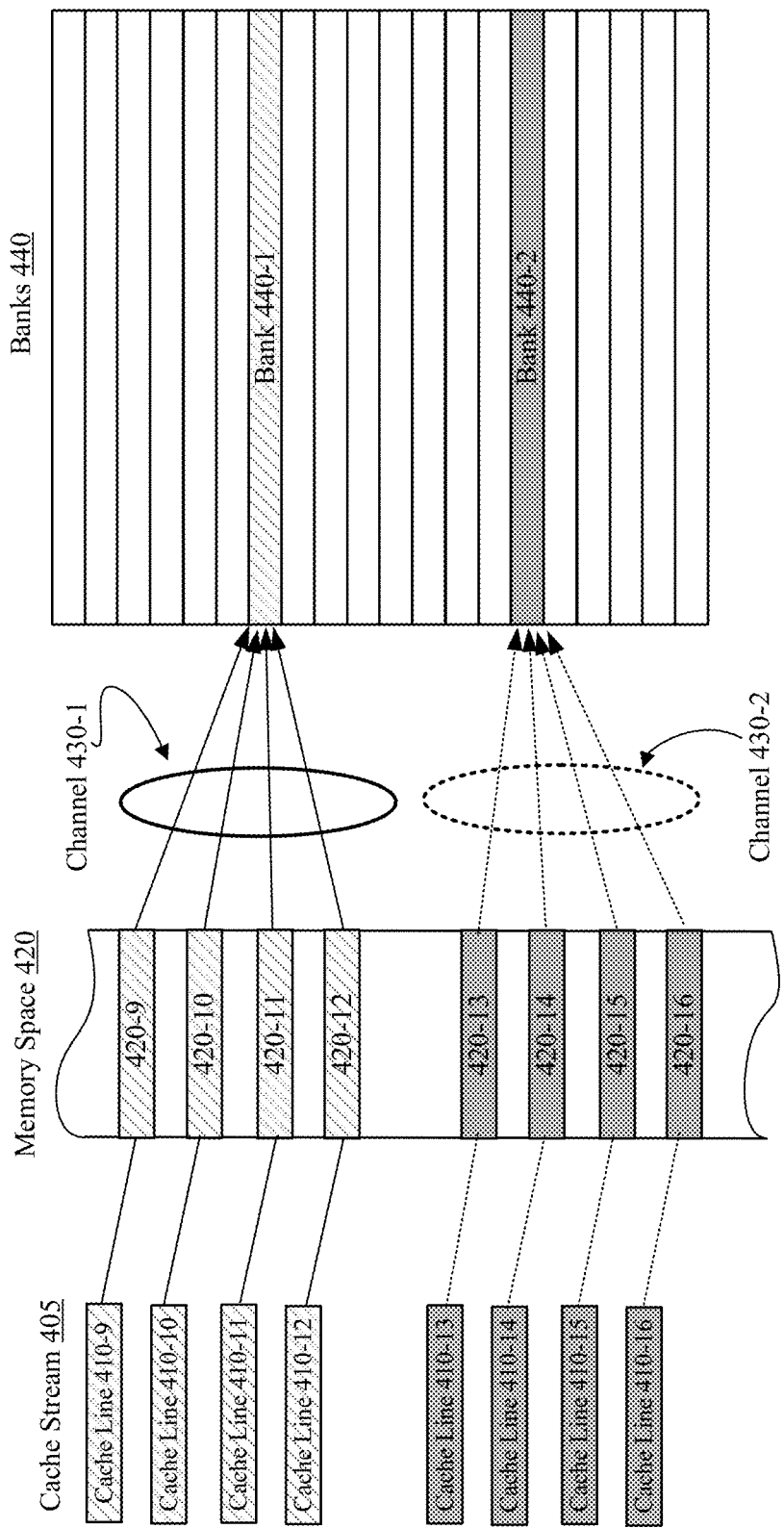

FIGS. 4A and 4B illustrates an example scheme 400. In some examples, scheme 400 may depict how address interleave policy 300 may be implemented for a 4-way interleave of cache lines 410-1 to 410-16 included in cache stream 405. In some examples, as shown in FIGS. 4A-B, implementation of address interleave policy 300 may cause cache lines 410-1 to 410-4 having respective logical memory spaces 420-1 to 420-4 and cache lines 410-9 to 410-12 having respective logical memory spaces 420-9 to 420-12 to be mapped to channel 430-1 and to bank 440-1. Meanwhile cache lines 410-5 to 410-8 having respective logical memory spaces 420-5 to 420-8 and cache lines 410-13 to 410-16 having respective logical memory spaces 420-13 to 420-16 to be mapped to channel 430-2 and to bank 440-2.

Figure 5:
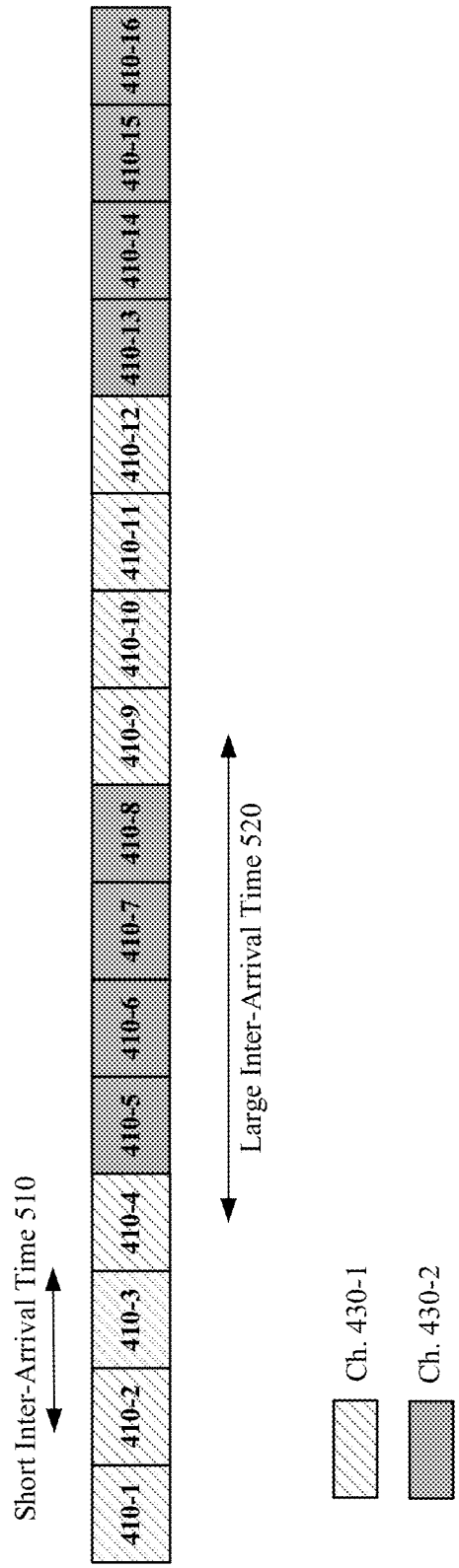
FIG. 5 illustrates an example cache stream.

FIG. 5 illustrates an example cache stream 405. In some examples, cache stream 405 is depicted in a manner that shows how the 4-way interleave of cache lines 410-1 to 410-16 mapped to and interleaved between channels 430-1 and 430-2 may have different inter-arrival times. For these examples, the different inter-arrival times may be used to determine time values for a 2-level auto-close timer. The interleaving between channels 430-1 and 430-2 introduces a short inter-arrival time 510 and a large inter-arrival time 520 to access a same bank. For example, short inter-arrival time 510 may be an arrival time between accesses to bank 440-1 for cache lines 410-1 to 410-4 and 410-9 to 410-12 or between accesses to bank 440-2 for cache lines 410-5-401-8 and 410-13 to 410-16. Large inter-arrival time 520 may be an arrival time between a last cache line of a 4-way interleave mapped to bank 440-1 is accessed and when a subsequent 4-way interleave mapped to bank 440-1 is accessed.

In some examples, for cache stream 405, successive accesses to cache lines mapped to a same bank such as cache lines 410-1 to 410-4 to bank 440-1 may have a first level of a 2-level auto-close timer set to increase a likelihood of empty accesses compared to page misses for accesses to different rows or increase a likelihood of page hits for access to a same row. Put another way, the first level may be set to a time value that either increase a likelihood of type-I accesses (page hits) or decreases a likelihood of a type-II access (page miss/row left open too long). For these examples, the first level should be set to a time value for a time similar to short inter-arrival time 510 to increase a likelihood of a type-I access and decrease a likelihood of a type-II access.

According to some examples, for cache stream 405, accesses to cache lines 410-1 to 410-4 and then to cache lines 410-9 to 410-12 mapped to bank 440-1 may potentially be page hits, but only if the row accessed for cache lines 410-1 to 410-4 is kept open long enough to capture large inter-arrival time 520. Put another way, the second level of the 2-level auto-close timer may be set to a time value that increases a likelihood of page hits. For these examples, a second level of the 2-level auto-close timer may be set to a time similar to large inter-arrival time 520.

Figure 6:
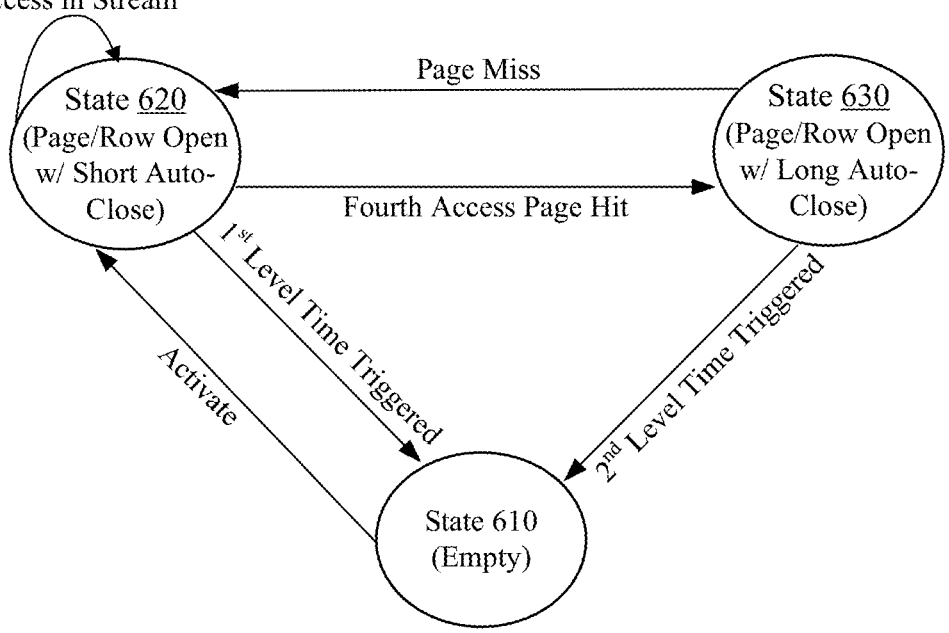
FIG. 6 illustrates an example state machine.

FIG. 6 illustrates an example state machine 600. According to some examples, as shown in FIG. 6, state machine 600 includes a state 610 (empty), a state 620 (page/row open w/short auto-close) and a state 630 (page/row open w/long auto-close. For these examples, state machine 600 depicts a way in which logic and/or features of a memory controller (e.g., timer logic 114) may implement a 2-level auto-close timer when faced with 2-level inter-arrival times caused by use of address interleave policy 300 and 4-way interleave of cache lines included in cache stream 405 as shown in FIGS. 4A-B and FIG. 5.

According to some examples, at state 610, an initial access to a cache line (e.g., cache line 410-1) mapped to a first channel results in an empty access. Then at state 620, page/row accessed following subsequent page misses for a first 3 accesses in a cache stream may continue to trigger a first level timer to close accessed rows to increase a likelihood of empty accesses as state machine 600 moves back and forth between state 610 and 620 each time the first level time is triggered following an access. However, if the fourth access to a mapped cache line (e.g., cache line 410-4) results in a page hit, state 630 is entered and the row/page for this fourth access is opened with a long auto-close that triggers a second level timer to keep the row open following the fourth access to accommodate a longer or larger inter-arrival time as the other cache lines in cache stream 405 are accessed via the second mapped channel (e.g., cache lines 410-5 to 410-8) and then accesses return to cache lines mapped to the first channel.

Figure 7:
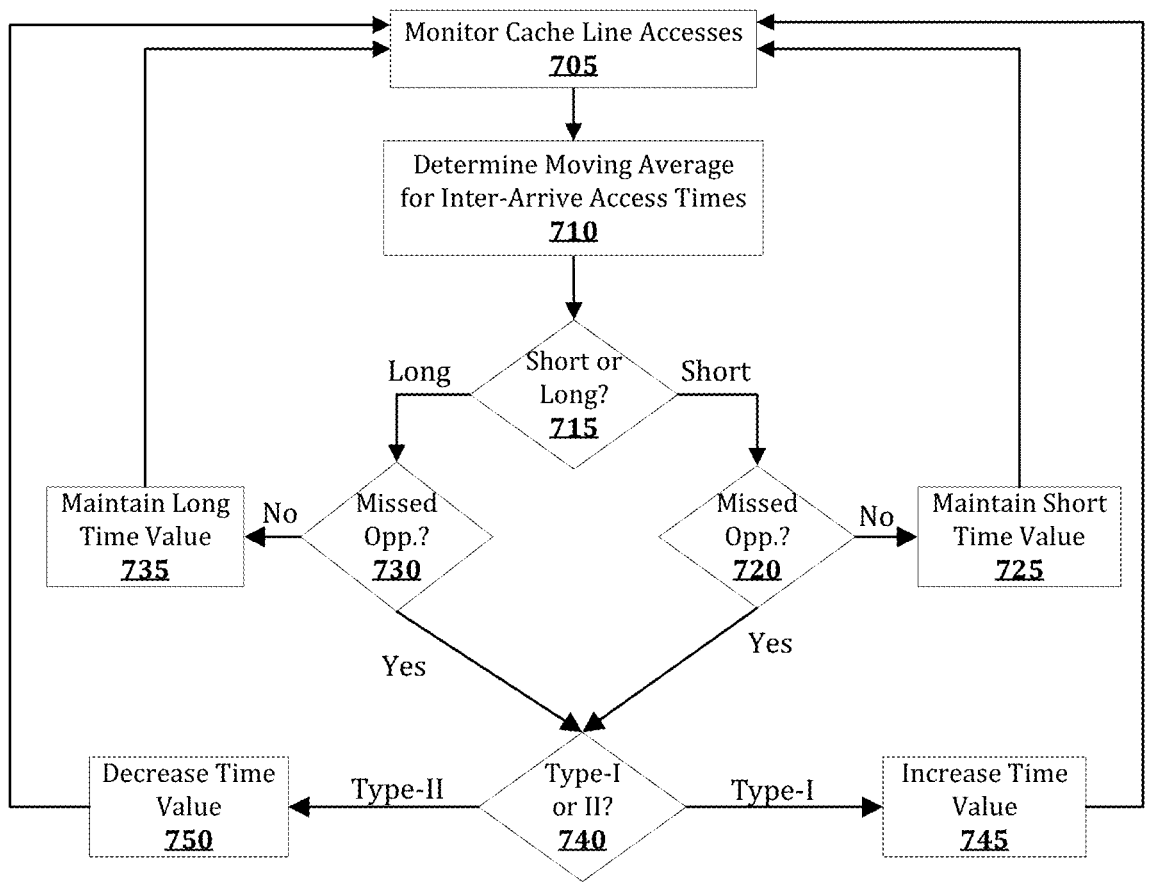
FIG. 7 illustrates an example first logic flow.

FIG. 7 illustrates an example logic flow 700. In some examples, logic flow 700 may be implemented by logic and/or features of a memory controller such timer logic 114 included in memory controller 112-1 or memory controller 112-2 shown in FIG. 1 to adaptively modify or adapt time values for short or long auto-close times for a 2-level auto-close timer. For these examples, the 2-level auto-close timer may be based on expected 2-level inter-arrival timing for row/bank accesses associated with implementing a 2-channel address interleaving policy.

Beginning at block 705, timer logic 114 of memory controller 112-1 monitors cache line accesses to DIMM 105-1 mapped to channel 140 and to DIMM 105-2 mapped to channel 150. In some examples, the cache line accesses may occur according to an address interleave policy such as address interleave policy 300. As part of the monitoring of the cache line accesses, timer logic 114 may monitor arrival times for cache line accesses to banks of memory devices for cache lines mapped to channels 140 and 150. For example, cache lines to access bank 220-1 of rank 200 included on DIMM 105-1 mapped to channel 140. Timer logic 114 may differentiate between short inter-arrival accesses (e.g., during a physical address interleave to bank 220-1) and long inter-arrival accesses (e.g., caused by channel interleaving between channel 140 and 150).

Moving to block 710, timer logic 114 may determine a moving average for inter-arrival access times to compare to a targeted auto-close time. According to some examples, the moving average may be based on timer logic 114's monitoring of arrival times for every 2 cache line accesses to a bank of memory devices for cache lines mapped to channel 140 or channel 150.

Moving to decision block 715, timer logic 114 may determine whether the moving average is associated with a short or long inter-arrival access. In some examples, the moving average is associated with a short inter-arrival access if the 2 cache line accesses were during consecutive or successive accesses to a same bank. For these examples, the moving average is associated with a long inter-arrival access if the 2 cache line accesses were not consecutive or non-successive accesses to a same bank. In other words, the 2 cache line accesses used to determine the moving average were based on a first cache line access to a first bank mapped to a first channel that was interleaved with cache accesses to a second bank mapped to a second channel before the second cache line access to the first bank. If the moving average is associated with a short inter-arrival access, logic flow 700 moves to decision block 720. If the moving average is associated with a long inter-arrival access, logic flow 700 moves to decision block 730.

Moving from decision block 715 to decision block 720, timer logic 114 determines whether the moving average for a short level time of the 2-level timer resulted in a missed opportunity for a page hit or a missed opportunity for an empty access. According to some examples, a target short level time value may represent an ideal auto-close time for a first (short) level time of a 2-level auto-close timer in order to increase a likelihood of a page hit and decrease a likelihood of a page miss. For these examples, a missed opportunity for a page hit access occurs if the short level time of the 2-level timer was too short and resulted in a row being closed before a subsequent access to the row that would have been a page hit. A missed opportunity for an empty access occurs if the short level time was too long and resulted in a row being opened during a subsequent access to a different row that was a page miss that could have been an empty if the row had not been open during the subsequent access. If no missed opportunities, logic flow 700 moves to block 725. Otherwise, logic flow 700 moves to decision block 740.

Moving from decision block 720 to block 725, timer logic 114 maintains the short time value for the short level time of the 2-level timer. Logic flow 700 may then return to block 705.

Moving from decision block 715 to decision block 720, timer logic 114 determines whether the moving average for a long level time of the 2-level timer resulted in a missed opportunity for a page hit access or a missed opportunity for an empty access. According to some examples, a target short level time value may represent an ideal auto-close time of a second (long) level time for a 2-level auto-close timer in order to increase a likelihood of page hit accesses and decrease a likelihood of page miss accesses. For these examples, a missed opportunity for a page hit access occurs if the long level time of the 2-level timer was too short and resulted in a row being closed before a subsequent access to the row that would have been a page hit. A missed opportunity for an empty access occurs if the long level time was too long and resulted in a row being opened during a subsequent access to a different row that resulted in a page miss that could have been an empty if the row had not been open during the subsequent access. If no missed opportunities, logic flow 700 moves to block 735. Otherwise, logic flow 700 moves to decision block 740.

Moving from decision block 730 to block 735, timer logic 114 maintains the short time value for the short level time of the 2-level timer. Logic flow 700 may then return to block 705.

Moving from decision blocks 720 or 730, timer logic 114 determines whether the missed opportunity resulted in a type-I access or a type-II access. If the missed opportunity resulted in a type-I access, logic flow 700 moves to block 745, If the missed opportunity resulted in a type-II access, logic flow 700 moves to block 750.

Moving from decision block 740 to block 745, timer logic 114 may increase a time value. If the opportunity was for a short level time of the 2-level timer that resulted in a missed opportunity, the short level time is increased to increase a likelihood of page hit accesses for short inter-arrival cache line access. If the opportunity was for a long level time of the 2-level timer that resulted in a missed opportunity, the long level time is increased to increase a likelihood of page hit accesses for long inter-arrival cache line access. Logic flow 700 then moves back to block 705.

Moving from decision block 740 to block 750, timer logic 114 may decrease a time value. If the opportunity was for a short level time of the 2-level timer that resulted in a missed opportunity, the short level time is decreased to decrease a likelihood of page miss accesses for short inter-arrival cache line access. If the opportunity was for a long level time of the 2-level timer that resulted in a missed opportunity, the long level time is decreased to decrease a likelihood of page miss accesses for long inter-arrival cache line access. Logic flow 700 then moves back to block 705.

Figure 8:
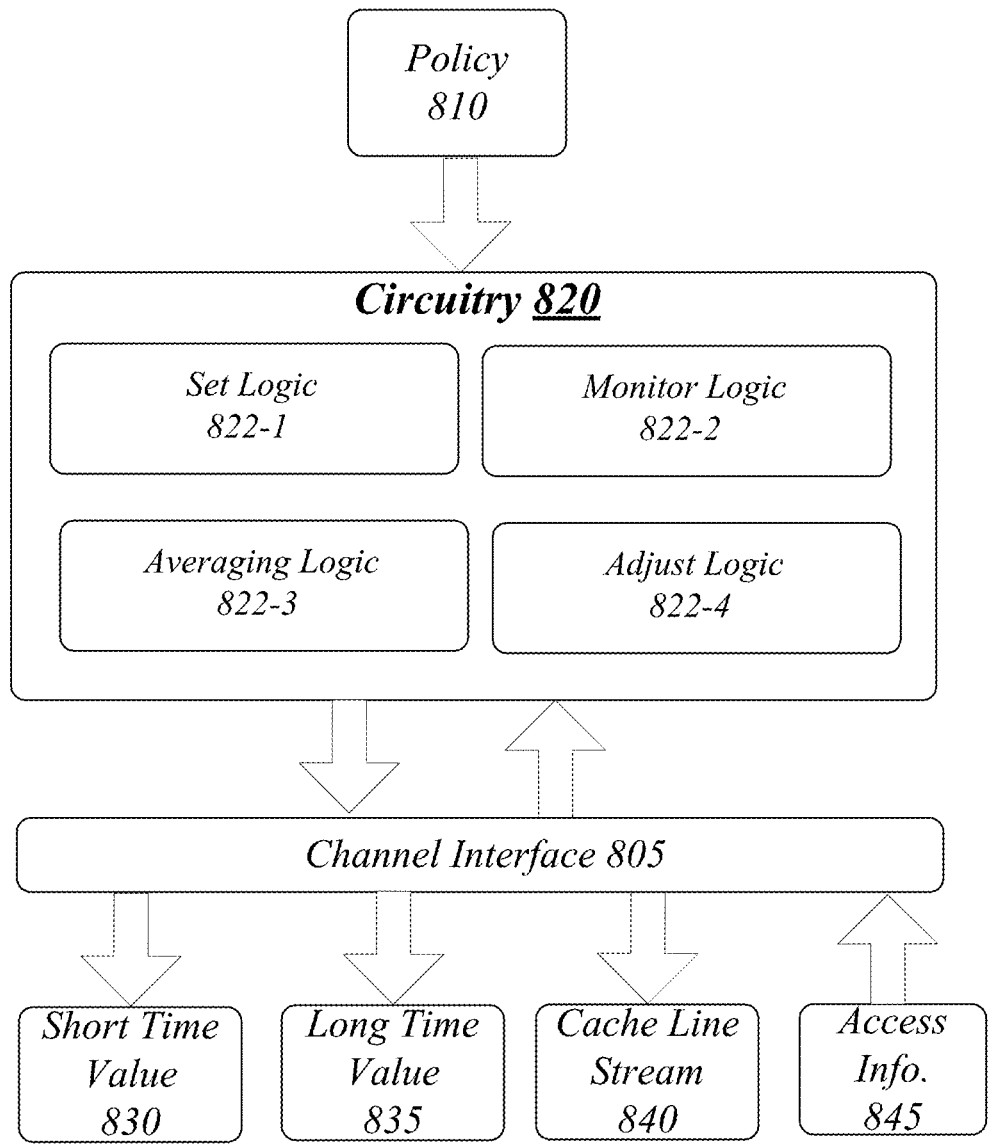
FIG. 8 illustrates an example apparatus.

FIG. 8 illustrates an example Apparatus 800. Although apparatus 800 shown in FIG. 8 has a limited number of elements in a certain topology, it may be appreciated that apparatus 800 may include more or less elements in alternate topologies as desired for a given implementation.

According to some examples, apparatus 800 may be timer logic of a memory controller such as timer logic 114 of memory controller 112-1 or 112-2 shown in FIG. 1 and may be supported by circuitry 820. For these examples, circuitry 820 may be an ASIC, FPGA, configurable logic, processor, processor circuit, or one or more cores of a processor such as processor 110. Circuitry 820 may be arranged to execute logic, or one or more software or firmware implemented modules, components or features of the logic. It is worthy to note that "a" and "b" and "c" and similar designators as used herein are intended to be variables representing any positive integer. Thus, for example, if an implementation sets a value for a=4, then a complete set of software or firmware for modules, components of logic 822-a may include logic 822-1, 822-2, 822-3 or 822-4. The examples presented are not limited in this context and the different variables used throughout may represent the same or different integer values. Also, "module", "component" or "feature" may also include software or firmware stored in computer-readable or machine-readable media, and although types of features are shown in FIG. 8 as discrete boxes, this does not limit these types of features to storage in distinct computer-readable media components (e.g., a separate memory, etc.).

According to some examples, apparatus 800 may include a channel interface 805 to access memory devices via multiple channels. For example, to enable logic of apparatus 800 to set levels of a 2-level auto-close timer or monitor cache line accesses to rows across banks of memory devices coupled to the multiple channels, as described more below.

In some examples, apparatus 800 may also include a set logic 822-1. Set logic 822-1 may be executed or supported by circuitry 820 to set a first time value for a first level of a 2-level auto-close timer. For these examples, the first level of the 2-level auto-close timer may be included in short time value 830 and is set to cause a row of a bank of first memory devices to auto-close following a first cache line access to the row responsive to a multi-channel address interleave policy. The multi-channel address interleave policy may be included in policy 810 and this policy causes successive cache line accesses included in cache line stream 840 to the bank of first memory devices via a first channel of the multiple channels.

In some examples, set logic 822-1 may also be executed or supported by circuitry 820 to set a second time value for a second level of the 2-level auto-close timer. For these examples, the second level of the 2-level auto-close timer may be included in short time value 835 and is set to cause the row to auto-close following a second cache line access to the row responsive to the multi-channel interleave policy that causes non-successive cache line accesses to the bank of first memory devices via the first channel.

According to some examples, apparatus 800 may also include a monitor logic 822-2. Monitor logic 822-2 may be executed or supported by circuitry 820 to monitor cache line accesses for cache line stream 840 and gather access timing information included in access information 845. For these examples, the multi-channel address interleave policy included in policy 810 may be a 2-channel address interleave policy that includes a first 4-way interleave that maps physical memory addresses of the bank of first memory devices to a first set of four cache lines of cache line stream 840 to the first channel to cause the successive cache line access to the bank of first memory devices.

In some examples, apparatus 800 may also include an averaging logic 822-3. Averaging logic 822-3 may be executed or supported by circuitry 820 to determine a moving average inter-arrival time of at least two successive cache line accesses for the first set of four cache lines based on the access time information included in access information 845.

According to some examples, apparatus 800 may also include an adjust logic 822-4. Adjust logic 822-4 may be executed or supported by circuitry 820 to adjust the first time value for the first level of the 2-level auto-close timer to either increase a likelihood of a page hit or decrease a likelihood for a page miss for a subsequent cache line access to the bank of first memory devices via the first channel. For this example, adjust logic 822-4 increases short time value

830 to increase a likelihood of a page hit or may decrease short time value 830 to decrease a likelihood for a page miss.

In some examples, the 2-channel address interleave policy may further include a second 4-way interleave that maps physical memory addresses of a row of a bank of second memory devices to a next set of four cache lines of cache line stream 840 to a second channel of the multiple channels coupled to channel interface 805. The 2-channel address interleave policy may also include a third 4-way interleave that maps physical memory addresses of the row of the bank of first memory devices to a third set of four cache lines of cache line stream 840 to the first channel. For these examples, the 2-channel address interleave policy to cause the non-successive cache line accesses to the bank of the first memory device includes the 2-channel address interleave policy to cause an access to a last cache line of the first 4-way interleave and access to a first cache line of the third 4-way interleave. Also, for these examples, monitor logic 822-2 may monitor access to the last cache line of the first 4-way interleave and access to the first cache line of the third 4-way interleave to gather access timing information included in access information 845. Averaging logic 822-3 may then determine a moving average inter-arrival time between access to the last cache line and the first cache line and adjust logic 822-4 may adjust the second time value for the second level of the 2-level auto-close timer to increase a likelihood of a page hit or decrease a likelihood for a page miss for a subsequent cache line access to the bank of first memory devices via the first channel when the subsequent cache line access is preceded by a cache line access to the bank of second memory devices via the second channel. For this example, adjust logic 822-4 increases short time value 835 to increase a likelihood of a page hit or may decrease short time value 835 to decrease a likelihood for a page miss.

Various components of apparatus 800 may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Example connections include parallel interfaces, serial interfaces, and bus interfaces.

Included herein is a set of logic flows representative of example methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow may be implemented in software, firmware, and/or hardware. In software and firmware embodiments, a logic flow may be implemented by computer executable instructions stored on at least one non-transitory computer readable medium or machine readable medium, such as an optical, magnetic or semiconductor storage. The embodiments are not limited in this context.

FIG. 9 illustrates an example logic flow 900. Logic flow 900 may be representative of some or all of the operations executed by one or more logic, features, or devices described herein, such as apparatus 800. More particularly, logic flow 900 may be implemented by set logic 822-1.

According to some examples, logic flow 900 at block 902 may set a first time value for a first level of a 2-level auto-close timer, the first level of the 2-level auto-close timer to cause a row of a bank of first memory devices to auto-close following a first cache line access to the row responsive to a multi-channel address interleave policy that causes successive cache line accesses to the bank of first memory devices via a first channel coupled with a processor. For these examples, set logic 822-1 may set the first level of the 2-level auto-close timer to establish a short time value associated with short inter-arrival times for cache line accesses to the bank of the first memory devices.

In some examples, logic flow 900 at block 904 may set a second time value for a second level of the 2-level auto-close timer, the second level of the 2-level auto-close timer to cause the row to auto-close following a second cache line access to the row responsive to the multi-channel interleave policy that causes non-successive cache line accesses to the bank of first memory devices via the first channel. For these examples, set logic 822-1 may set the second level of the 2-level auto-close timer to establish a short time value associated with long inter-arrival times for cache line accesses to the bank of the first memory devices.

FIG. 10 illustrates an example storage medium 1000. In some examples, storage medium 1400 may be an article of manufacture. Storage medium 1000 may include any non-transitory computer readable medium or machine readable medium, such as an optical, magnetic or semiconductor storage. Storage medium 1000 may store various types of computer executable instructions, such as instructions to implement logic flow 900. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 11:
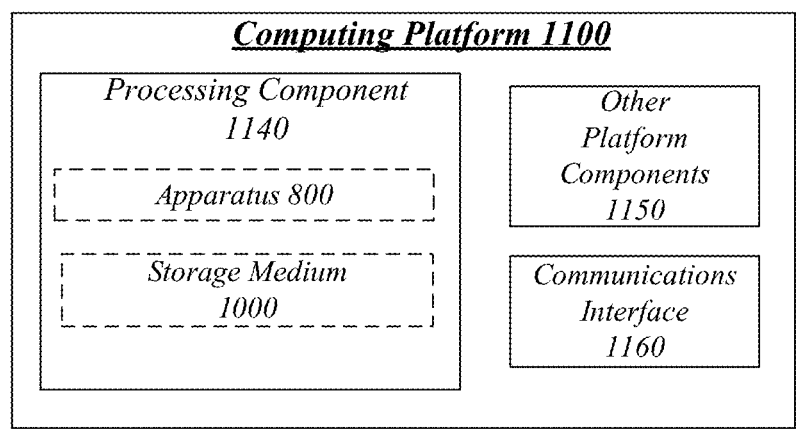
FIG. 11 illustrates an example computing platform.

FIG. 11 illustrates an example computing platform 1100. In some examples, as shown in FIG. 11, computing platform 1100 may include a processing components 1140, other platform components 1150 or a communications interface 1160.

According to some examples, processing components 1140 may execute or implement processing operations or logic for apparatus 800 and/or storage medium 1000. Processing components 1140 may include various hardware elements, software elements, or a combination of both to implement a processor such as processor 110 shown in FIG. 1. Examples of hardware elements may include devices, logic devices, components, processors, microprocessors, management controllers, companion dice, circuits, processor circuits, circuit elements (e.g., transistors, resistors, capacitors, inductors, and so forth), integrated circuits, ASICs, programmable logic devices (PLDs), digital signal processors (DSPs), FPGAs, memory units, logic gates, registers, semiconductor device, chips, microchips, chip sets, and so forth. Examples of software elements may include software components, programs, applications, computer programs, application programs, device drivers, system programs, software development programs, machine programs, operating system software, middleware, firmware, software modules, routines, subroutines, functions, methods, procedures, software interfaces, application program interfaces (APIs), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

In some examples, other platform components 1150 may include common computing elements, memory units (that include system memory), chipsets, controllers, peripherals, interfaces, oscillators, timing devices, video cards, audio cards, multimedia input/output (I/O) components (e.g., digital displays), power supplies, and so forth. Examples of memory units or memory devices may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory), solid state drives (SSD) and any other type of storage media suitable for storing information.

In some examples, communications interface 1160 may include logic and/or features to support a communication interface. For these examples, communications interface 1160 may include one or more communication interfaces that operate according to various communication protocols or standards to communicate over direct or network communication links. Direct communications may occur via use of communication protocols or standards described in one or more industry standards (including progenies and variants) such as those associated with the PCIe specification, the NVMe specification or the I3C specification. Network communications may occur via use of communication protocols or standards such those described in one or more Ethernet standards promulgated by the Institute of Electrical and Electronics Engineers (IEEE). For example, one such Ethernet standard promulgated by IEEE may include, but is not limited to, IEEE 802.3-2018, Carrier sense Multiple access with Collision Detection (CSMA/CD) Access Method and Physical Layer Specifications, Published in August 2018 (hereinafter "IEEE 802.3 specification"). Network communication may also occur according to one or more OpenFlow specifications such as the OpenFlow Hardware Abstraction API Specification. Network communications may also occur according to one or more Infiniband Architecture specifications.

Computing platform 1100 may be implemented in a server or client computing device. Accordingly, functions and/or specific configurations of computing platform 1100 described herein, may be included or omitted in various embodiments of computing platform 1100, as suitably desired for a server or client computing device.

The components and features of computing platform 1100 may be implemented using any combination of discrete circuitry, ASICs, logic gates and/or single chip architectures. Further, the features of computing platform 1100 may be implemented using microcontrollers, FPGAs and/or microprocessors or any combination of the foregoing where suitably appropriate. It is noted that hardware, firmware and/or software elements may be collectively or individually referred to herein as "logic" or "circuit."

It should be appreciated that the exemplary computing platform 1100 shown in the block diagram of FIG. 11 may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" and may be similar to IP blocks. IP cores may be stored on a tangible, machine readable medium and supplied to various customers or manufacturing facilities to load into the fabrication machines that actually make the logic or processor.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some examples may include an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled" or "coupled with", however, may also mean that two or more elements are not in direct contact with each other, but yet still co-operate or interact with each other.

To the extent various operations or functions are described herein, they can be described or defined as software code, instructions, configuration, and/or data. The content can be directly executable ("object" or "executable" form), source code, or difference code ("delta" or "patch" code). The software content of what is described herein can be provided via an article of manufacture with the content stored thereon, or via a method of operating a communication interface to send data via the communication interface. A machine readable storage medium can cause a machine to perform the functions or operations described and includes any mechanism that stores information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface can be configured by providing configuration parameters and/or sending signals to prepare the communication interface to provide a data signal describing the software content. The communication interface can be accessed via one or more commands or signals sent to the communication interface.

The follow examples pertain to additional examples of technologies disclosed herein.

Example 1

An example apparatus may include an interface of a memory controller to access memory devices via multiple channels and circuitry of the memory controller. The circuitry may set a first time value for a first level of a 2-level auto-close timer. The first level of the 2-level auto-close timer to cause a row of a bank of first memory devices to auto-close following a first cache line access to the row responsive to a multi-channel address interleave policy that causes successive cache line accesses to the bank of first memory devices via a first channel of the multiple channels. The circuitry may also set a second time value for a second level of the 2-level auto-close timer. The second level of the 2-level auto-close timer to cause the row to auto-close following a second cache line access to the row responsive to the multi-channel address interleave policy that causes non-successive cache line accesses to the bank of first memory devices via the first channel.

Example 2

The apparatus of example 1, the multi-channel address interleave policy may be a 2-channel address interleave policy that includes a first 4-way interleave that maps physical memory addresses of the bank of first memory devices to a first set of four cache lines of a stream of cache lines to the first channel to cause the successive cache line accesses to the bank of first memory devices.

Example 3

The apparatus of example 2, the circuitry may also monitor cache line accesses for the first set of four cache lines of the stream of cache lines. The circuitry may also determine a moving average inter-arrival time of at least two successive cache line accesses for the first set of four cache lines. The circuitry may also adjust the first time value for the first level of the 2-level auto-close timer to increase a likelihood of a page hit for a subsequent cache line access to the bank of first memory devices via the first channel.

Example 4

The apparatus of example 2, the circuitry may also monitor cache line accesses for the first set of four cache lines of the stream of cache lines. The circuitry may also determine a moving average inter-arrival time of at least two successive cache line accesses for the first set of four cache lines. The circuitry may also adjust the first time value for the first level of the 2-level auto-close timer to decrease a likelihood of a page miss for a subsequent cache line access to the bank of first memory devices via the first channel.

Example 5

The apparatus of example 2, the 2-channel address interleave policy may also include a second 4-way interleave that maps physical memory addresses of a row of a bank of second memory devices to a next set of four cache lines of the stream of cache lines to a second channel of the multiple channels. The 2-channel address interleave policy may also include a third 4-way interleave that maps physical memory addresses of the row of the bank of first memory devices to a third set of four cache lines of the stream of cache lines to the first channel. For this example, to cause the non-successive cache line accesses to the bank of the first memory devices includes the 2-channel address interleave policy to cause an access to a last cache line of the first 4-way interleave and access to a first cache line of the third 4-way interleave.

Example 6

The apparatus of example 5, the circuitry may also monitor access to the last cache line of the first 4-way interleave and access to the first cache line of the third 4-way interleave. The circuitry may also determine a moving average inter-arrival time of between access to the last cache line and the first cache line. The circuitry may also adjust the second time value for the second level of the 2-level auto-close timer to increase a likelihood of a page hit for a subsequent cache line access to the bank of first memory devices via the first channel when the subsequent cache line access is preceded by a cache line access to the bank of second memory devices via the second channel.

Example 7

The apparatus of example 5, the circuitry may also monitor access to the last cache line of the first 4-way interleave and access to the first cache line of the third 4-way interleave. The circuitry may also determine a moving average inter-arrival time of between access to the last cache line and access to the first cache line. The circuitry may also adjust the second time value for the second level of the 2-level auto-close timer to decrease a likelihood of a page miss for a subsequent cache line access to the bank of first memory devices via the first channel when the subsequent cache line access is preceded by a cache line access to the bank of second memory devices.

Example 8

The apparatus of example 5, the bank of first memory devices may include a plurality of first memory die arranged on a first DIMM and the bank of the second memory devices includes a plurality of second memory die arranged on a second DIMM Example 9

The apparatus of example 1, the first and second cache line accesses may separately access 64 bytes of data from the row of the bank of first memory devices.

Example 10

The apparatus of example 1, the bank of first memory devices may be a plurality of memory die arranged on a DIMM.

Example 11

The apparatus of example 1, the first memory devices may include dynamic random access memory.

Example 12

An example method may include setting a first time value for a first level of a 2-level auto-close timer. The first level of the 2-level auto-close timer may cause a row of a bank of first memory devices to auto-close following a first cache line access to the row responsive to a multi-channel address interleave policy that causes successive cache line accesses to the bank of first memory devices via a first channel coupled with a processor. The method may also include setting a second time value for a second level of the 2-level auto-close timer. The second level of the 2-level auto-close timer may cause the row to auto-close following a second cache line access to the row responsive to the multi-channel address interleave policy that causes non-successive cache line accesses to the bank of first memory devices via the first channel.

Example 13

The method of example 12, the multi-channel address interleave policy may be a 2-channel address interleave policy that includes a first 4-way interleave that maps physical memory addresses of the bank of first memory devices to a first set of four cache lines of a stream of cache lines to the first channel to cause the successive cache line accesses to the bank of first memory devices.

Example 14

The method of example 13 may also include monitoring cache line accesses for the first set of four cache lines of the stream of cache lines. The method may also include determining a moving average inter-arrival time of at least two successive cache line accesses for the first set of four cache lines. The method may also include adjusting the first time value for the first level of the 2-level auto-close timer to increase a likelihood of a page hit for a subsequent cache line access to the bank of first memory devices via the first channel.

Example 15

The method of example 13 may also include monitoring cache line accesses for the first set of four cache lines of the stream of cache lines. The method may also include determining a moving average inter-arrival time of at least two successive cache line accesses for the first set of four cache lines. The method may also include adjusting the first time value for the first level of the 2-level auto-close timer to decrease a likelihood of a page miss for a subsequent cache line access to the bank of first memory devices via the first channel.

Example 16

The method of example 13, the 2-channel address interleave policy also include a second 4-way interleave that maps physical memory addresses of a row of a bank of second memory devices to a next set of four cache lines of the stream of cache lines to a second channel coupled with the processor. The 2-channel address interleave policy also include a third 4-way interleave that maps physical memory addresses of the row of the bank of first memory devices to a third set of four cache lines of the stream of cache lines to the first channel. For this examples, to cause the non-successive cache line accesses to the bank of the first memory devices includes the 2-channel address interleave policy to cause an access to a last cache line of the first 4-way interleave and access to a first cache line of the third 4-way interleave.

Example 17

The method of example 16 may also include monitoring access to the last cache line of the first 4-way interleave and access to the first cache line of the third 4-way interleave. The method may also include determining a moving average inter-arrival time of between access to the last cache line and the first cache line. The method may also include adjusting the second time value for the second level of the 2-level auto-close timer to increase a likelihood of a page hit for a subsequent cache line access to the bank of first memory devices via the first channel when the subsequent cache line access is preceded by a cache line access to the bank of second memory devices via the second channel.

Example 18

The method of example 17 may also include monitoring access to the last cache line of the first 4-way interleave and access to the first cache line of the third 4-way interleave. The method may also include determining a moving average inter-arrival time of between access to the last cache line and access to the first cache line. The method may also include adjusting the second time value for the second level of the 2-level auto-close timer to decrease a likelihood of a page miss for a subsequent cache line access to the bank of the first memory devices via the first channel when the subsequent cache line access is preceded by a cache line access to the bank of second memory devices.

Example 19

The method of example 16, the bank of first memory devices may include a plurality of first memory die arranged on a first DIMM and the bank of the second memory devices includes a plurality of second memory die arranged on a second DIMM

Example 20

The method of example 12, the first and second cache line accesses may separately access 64 bytes of data from the row of the bank of first memory devices.

Example 21

The method of example 12, the bank of first memory devices may be a plurality of memory die arranged on a DIMM.

Example 22

The method of example 12, the first memory devices may include dynamic random access memory.

Example 23

An Example at least one machine readable medium that includes a plurality of instructions that in response to being executed by a system may cause the system to carry out a method according to any one of examples 12 to 22.

Example 24

An example apparatus may include means for performing the methods of any one of examples 12 to 22.

Example 25

An example at least one machine readable medium may include a plurality of instructions that in response to being executed by a system may cause the system to set a first time value for a first level of a 2-level auto-close timer. The first level of the 2-level auto-close timer may cause a row of a bank of first memory devices to auto-close following a first cache line access to the row responsive to a multi-channel address interleave policy that causes successive cache line accesses to the bank of first memory devices via a first channel coupled with a processor. The instructions may also cause the system to set a second time value for a second level of the 2-level auto-close timer. The second level of the 2-level auto-close timer may cause the row to auto-close following a second cache line access to the row responsive to the multi-channel address interleave policy that causes non-successive cache line accesses to the bank of first memory devices via the first channel.

Example 26

The at least one machine readable medium of example 25, the multi-channel address interleave policy may be a 2-channel address interleave policy that includes a first 4-way interleave that maps physical memory addresses of the bank of first memory devices to a first set of four cache lines of a stream of cache lines to the first channel to cause the successive cache line accesses to the bank of first memory devices.

Example 27

The at least one machine readable medium of example 26, the instructions may also cause the system to monitor cache line accesses for the first set of four cache lines of the stream of cache lines. The instructions may also cause the system to determine a moving average inter-arrival time of at least two successive cache line accesses for the first set of four cache lines. The instructions may also cause the system to adjust the first time value for the first level of the 2-level auto-close timer to increase a likelihood of a page hit for a subsequent cache line access to the bank of first memory devices via the first channel.

Example 28

The at least one machine readable medium of example 26, the instructions may also cause the system to monitor cache line accesses for the first set of four cache lines of the stream of cache lines. The instructions may also cause the system to determine a moving average inter-arrival time of at least two successive cache line accesses for the first set of four cache lines. The instructions may also cause the system to adjust the first time value for the first level of the 2-level auto-close timer to decrease a likelihood of a page miss for a subsequent cache line access to the bank of first memory devices via the first channel.

Example 29

The at least one machine readable medium of example 26, the 2-channel address interleave policy may also include a second 4-way interleave that maps physical memory addresses of a row of a bank of second memory devices to a next set of four cache lines of the stream of cache lines to a second channel coupled with the processor. The 2-channel address interleave policy may also include a third 4-way interleave that maps physical memory addresses of the row of the bank of first memory devices to a third set of four cache lines of the stream of cache lines to the first channel. For this example, to cause the non-successive cache line accesses to the bank of the first memory devices may include the 2-channel address interleave policy to cause an access to a last cache line of the first 4-way interleave and access to a first cache line of the third 4-way interleave.

Example 30

The at least one machine readable medium of example 29, the instructions may also cause the system to monitor access to the last cache line of the first 4-way interleave and access to the first cache line of the third 4-way interleave. The instructions may also cause the system to determine a moving average inter-arrival time of between access to the last cache line and the first cache line. The instructions may also cause the system to adjust the second time value for the second level of the 2-level auto-close timer to increase a likelihood of a page hit for a subsequent cache line access to the bank of first memory devices via the first channel when the subsequent cache line access is preceded by a cache line access to the bank of second memory devices via the second channel.

Example 31

The at least one machine readable medium of example 30, the instructions may also cause the system to monitor access to the last cache line of the first 4-way interleave and access to the first cache line of the third 4-way interleave. The instructions may also cause the system to determine a moving average inter-arrival time of between access to the last cache line and access to the first cache line. The instructions may also cause the system to adjust the second time value for the second level of the 2-level auto-close timer to decrease a likelihood of a page miss for a subsequent cache line access to the bank of the first memory devices via the first channel when the subsequent cache line access is preceded by a cache line access to the bank of second memory devices.

Example 32

The at least one machine readable medium of example 29, the bank of first memory devices may include a plurality of first memory die arranged on a first DIMM and the bank of the second memory devices includes a plurality of second memory die arranged on a second DIMM Example 33

The at least one machine readable medium of example 25, the first and second cache line accesses may separately access 64 bytes of data from the row of the bank of first memory devices.

Example 34

The at least one machine readable medium of example 25, the bank of first memory devices may be a plurality of memory die arranged on a DIMM.

Example 35

The at least one machine readable medium of example 25, the first memory devices may include dynamic random access memory.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus, the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first, " "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus comprising:
   an interface of a memory controller to access memory devices via multiple channels; and
   circuitry of the memory controller to:
     set a first time value for a first level of a 2-level auto-close timer, the first level of the 2-level auto-close timer to cause a row of a bank of first memory devices to auto-close following a first cache line access to the row responsive to a multi-channel address interleave policy that causes successive cache line accesses to the bank of first memory devices via a first channel of the multiple channels; and
     set a second time value for a second level of the 2-level auto-close timer, the second level of the 2-level auto-close timer to cause the row to auto-close following a second cache line access to the row responsive to the multi-channel address interleave policy that causes non-successive cache line accesses to the bank of first memory devices via the first channel.

2. The apparatus of claim 1, wherein the multi-channel address interleave policy comprises a 2-channel address interleave policy that includes a first 4-way interleave that maps physical memory addresses of the bank of first memory devices to a first set of four cache lines of a stream of cache lines to the first channel to cause the successive cache line accesses to the bank of first memory devices.

3. The apparatus of claim 2, wherein the circuitry is further to:
   monitor cache line accesses for the first set of four cache lines of the stream of cache lines;
   determine a moving average inter-arrival time of at least two successive cache line accesses for the first set of four cache lines; and
   adjust the first time value for the first level of the 2-level auto-close timer to increase a likelihood of a page hit for a subsequent cache line access to the bank of first memory devices via the first channel.

4. The apparatus of claim 2, wherein the circuitry is further to:
monitor cache line accesses for the first set of four cache lines of the stream of cache lines;
determine a moving average inter-arrival time of at least two successive cache line accesses for the first set of four cache lines; and
adjust the first time value for the first level of the 2-level auto-close timer to decrease a likelihood of a page miss for a subsequent cache line access to the bank of first memory devices via the first channel.

5. The apparatus of claim 2, wherein the 2-channel address interleave policy is to further include:
a second 4-way interleave that maps physical memory addresses of a row of a bank of second memory devices to a next set of four cache lines of the stream of cache lines to a second channel of the multiple channels;
a third 4-way interleave that maps physical memory addresses of the row of the bank of first memory devices to a third set of four cache lines of the stream of cache lines to the first channel; and
to cause the non-successive cache line accesses to the bank of the first memory devices includes the 2-channel address interleave policy to cause an access to a last cache line of the first 4-way interleave and access to a first cache line of the third 4-way interleave.

6. The apparatus of claim 5, wherein the circuitry is further to:
monitor access to the last cache line of the first 4-way interleave and access to the first cache line of the third 4-way interleave;
determine a moving average inter-arrival time of between access to the last cache line and the first cache line; and
adjust the second time value for the second level of the 2-level auto-close timer to increase a likelihood of a page hit for a subsequent cache line access to the bank of first memory devices via the first channel when the subsequent cache line access is preceded by a cache line access to the bank of second memory devices via the second channel.

7. The apparatus of claim 5, wherein the circuitry is further to:
monitor access to the last cache line of the first 4-way interleave and access to the first cache line of the third 4-way interleave;
determine a moving average inter-arrival time of between access to the last cache line and access to the first cache line; and
adjust the second time value for the second level of the 2-level auto-close timer to decrease a likelihood of a page miss for a subsequent cache line access to the bank of the first memory devices via the first channel when the subsequent cache line access is preceded by a cache line access to the bank of second memory devices.

8. The apparatus of claim 5, wherein the bank of first memory devices includes a plurality of first memory die arranged on a first dual in-line memory module (DIMM) and the bank of the second memory devices includes a plurality of second memory die arranged on a second DIMM.

9. The apparatus of claim 1, wherein the first and second cache line accesses are to separately access 64 bytes of data from the row of the bank of first memory devices.

10. The apparatus of claim 1, wherein the bank of first memory devices comprising a plurality of memory die arranged on a dual in-line memory module (DIMM).

11. The apparatus of claim 1, wherein the first memory devices including dynamic random access memory.

12. A method comprising:
setting, by circuitry of a memory controller, a first time value for a first level of a 2-level auto-close timer, the first level of the 2-level auto-close timer to cause a row of a bank of first memory devices to auto-close following a first cache line access to the row responsive to a multi-channel address interleave policy that causes successive cache line accesses to the bank of first memory devices via a first channel coupled with a processor; and
setting a second time value for a second level of the 2-level auto-close timer, the second level of the 2-level auto-close timer to cause the row to auto-close following a second cache line access to the row responsive to the multi-channel address interleave policy that causes non-successive cache line accesses to the bank of first memory devices via the first channel.

13. The method of claim 12, the multi-channel address interleave policy comprises a 2-channel address interleave policy that includes a first 4-way interleave that maps physical memory addresses of the bank of first memory devices to a first set of four cache lines of a stream of cache lines to the first channel to cause the successive cache line accesses to the bank of first memory devices.

14. The method of claim 13, further comprising:
monitoring cache line accesses for the first set of four cache lines of the stream of cache lines;
determining a moving average inter-arrival time of at least two successive cache line accesses for the first set of four cache lines; and
adjusting the first time value for the first level of the 2-level auto-close timer based on the moving average inter-arrival time to increase a likelihood of a page hit or decrease a likelihood for a page miss for a subsequent cache line access to the bank of first memory devices via the first channel.

15. The method of claim 13, comprising the 2-channel address interleave policy to further include:
a second 4-way interleave that maps physical memory addresses of a row of a bank of second memory devices to a next set of four cache lines of the stream of cache lines to a second channel coupled with the processor;
a third 4-way interleave that maps physical memory addresses of the row of the bank of first memory devices to a third set of four cache lines of the stream of cache lines to the first channel; and
to cause the non-successive cache line accesses to the bank of the first memory devices includes the 2-channel address interleave policy to cause an access to a last cache line of the first 4-way interleave and access to a first cache line of the third 4-way interleave.

16. The method of claim 15, further comprising:
monitoring access to the last cache line of the first 4-way interleave and access to the first cache line of the third 4-way interleave;
determining a moving average inter-arrival time of between access to the last cache line and the first cache line; and
adjusting the second time value for the second level of the 2-level auto-close timer based on the moving average inter-arrival time to increase a likelihood of a page hit or decrease a likelihood of a page miss for a subsequent cache line access to the bank of first memory devices via the first channel when the subsequent cache line access is preceded by a cache line access to the bank of second memory devices via the second channel.

17. At least one non-transitory machine readable medium comprising a plurality of instructions that in response to being executed by a system, cause the system to:
set a first time value for a first level of a 2-level auto-close timer, the first level of the 2-level auto-close timer to cause a row of a bank of first memory devices to auto-close following a first cache line access to the row responsive to a multi-channel address interleave policy that causes successive cache line accesses to the bank of first memory devices via a first channel coupled with a processor; and
set a second time value for a second level of the 2-level auto-close timer, the second level of the 2-level auto-close timer to cause the row to auto-close following a second cache line access to the row responsive to the multi-channel address interleave policy that causes non-successive cache line accesses to the bank of first memory devices via the first channel.

18. The at least one non-transitory machine readable medium of claim 17, the multi-channel address interleave policy comprises a 2-channel address interleave policy that includes a first 4-way interleave that maps physical memory addresses of the bank of first memory devices to a first set of four cache lines of a stream of cache lines to the first channel to cause the successive cache line accesses to the bank of first memory devices.

19. The at least one non-transitory machine readable medium of claim 18, further comprising the instructions to cause the system to:
monitor cache line accesses for the first set of four cache lines of the stream of cache lines;
determine a moving average inter-arrival time of at least two successive cache line accesses for the first set of four cache lines; and
adjust the first time value for the first level of the 2-level auto-close timer based on the moving average inter-arrival time to increase a likelihood of a page hit or decrease a likelihood for a page miss for a subsequent cache line access to the bank of first memory devices via the first channel.

20. The at least one non-transitory machine readable medium of claim 18, comprising the 2-channel address interleave policy to further include:
a second 4-way interleave that maps physical memory addresses of a row of a bank of second memory devices to a next set of four cache lines of the stream of cache lines to a second channel coupled with the processor;
a third 4-way interleave that maps physical memory addresses of the row of the bank of first memory devices to a third set of four cache lines of the stream of cache lines to the first channel; and
to cause the non-successive cache line accesses to the bank of the first memory devices includes the 2-channel address interleave policy to cause an access to a last cache line of the first 4-way interleave and access to a first cache line of the third 4-way interleave.

21. The at least one non-transitory machine readable medium of claim 20, further comprising the instructions to cause the system to:
monitor access to the last cache line of the first 4-way interleave and access to the first cache line of the third 4-way interleave;
determine a moving average inter-arrival time of between access to the last cache line and the first cache line; and
adjust the second time value for the second level of the 2-level auto-close timer based on the moving average inter-arrival time to increase a likelihood of a page hit or decrease a likelihood of a page miss for a subsequent cache line access to the bank of first memory devices via the first channel when the subsequent cache line access is preceded by a cache line access to the bank of second memory devices via the second channel.

* * * * *